Nov. 11, 1969  H. A. CONKLIN. JR  3,477,331
FORWARD TERMINATION MEANS FOR THE SPEAKING LENGTH
OF PIANO STRINGS AND THE LIKE
Filed Aug. 15, 1966  4 Sheets-Sheet 1
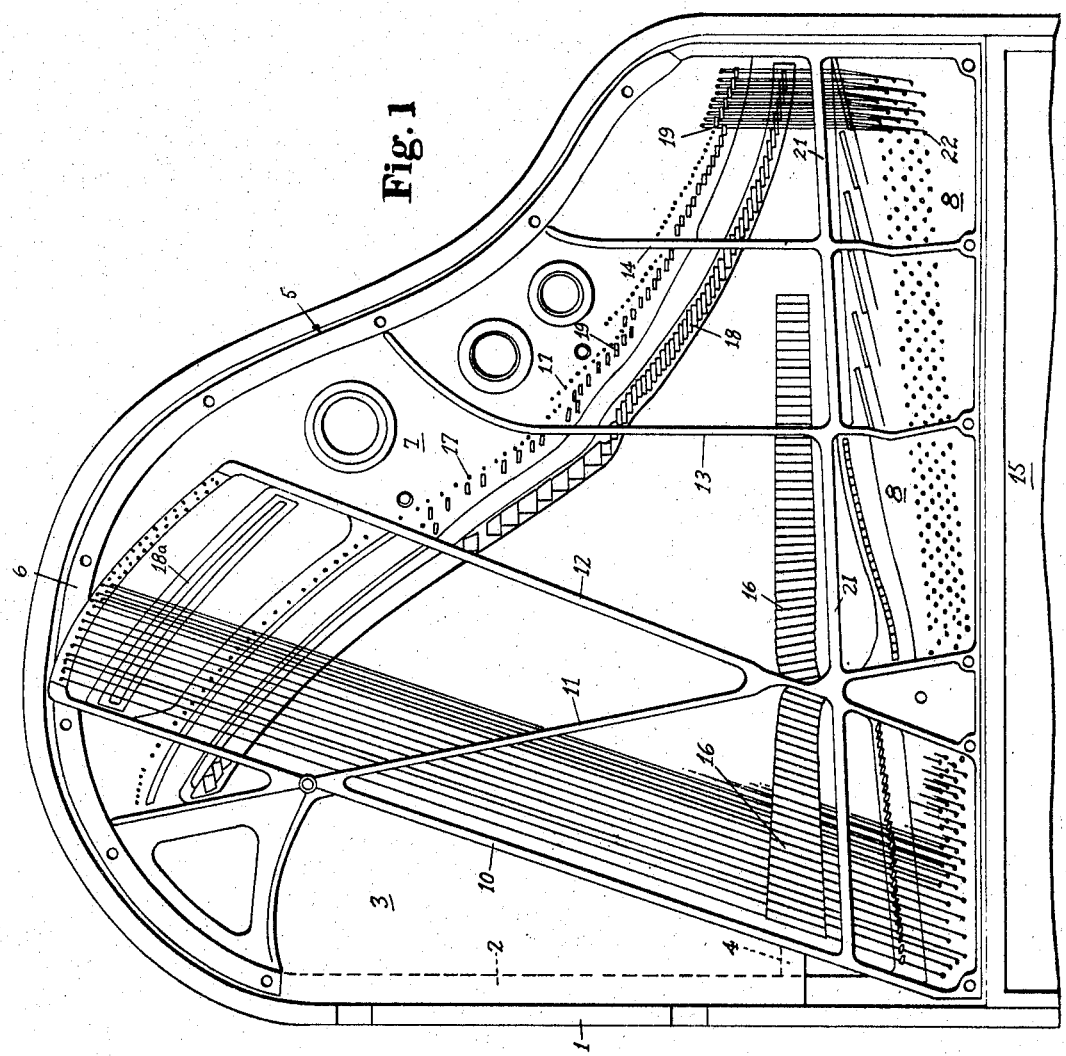
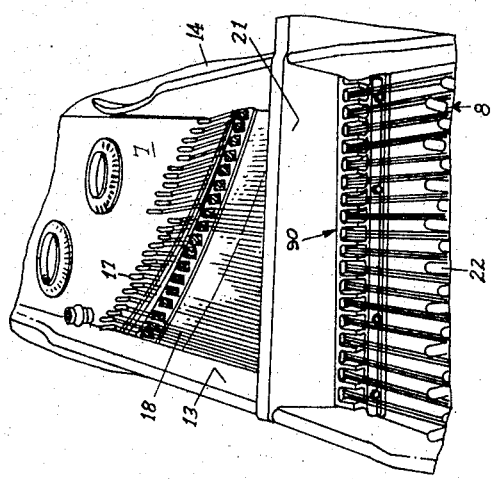
INVENTOR
HAROLD A. CONKLIN, JR.,
BY Yungblut, Melville, Strasser and Foster
ATTORNEYS Nov. 11, 1969   H. A. CONKLIN, JR   3,477,331
FORWARD TERMINATION MEANS FOR THE SPEAKING LENGTH
OF PIANO STRINGS AND THE LIKE
Filed Aug. 15, 1966   4 Sheets-Sheet 2
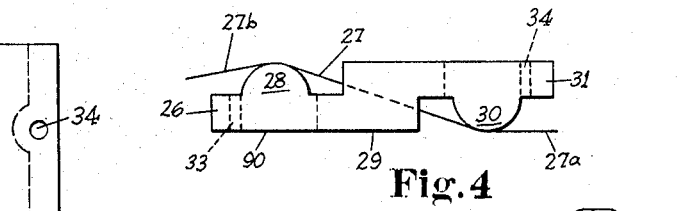
Fig. 4
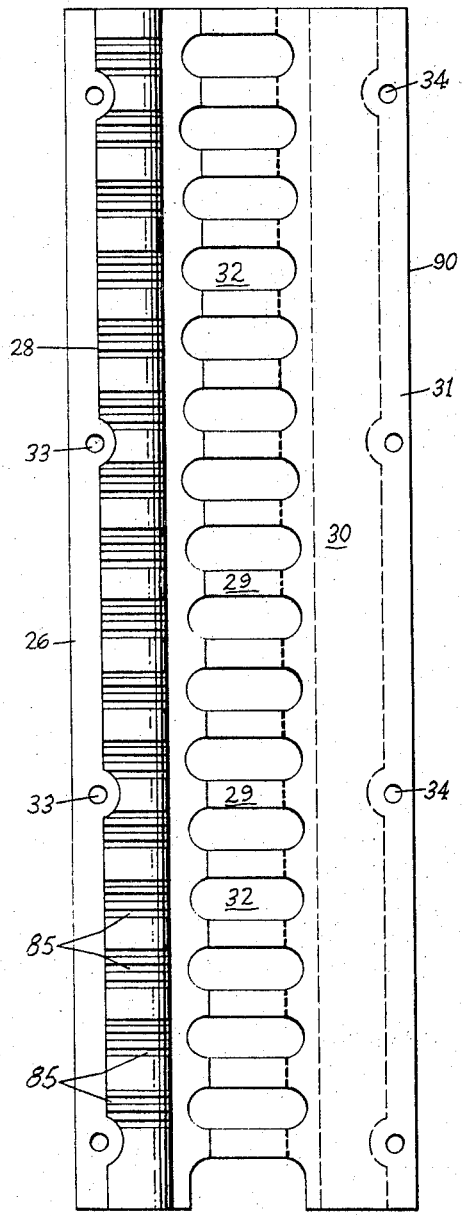
Fig. 3
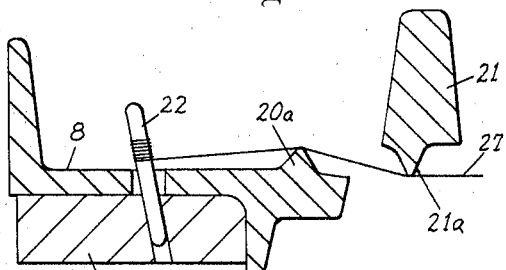
(PRIOR ART) Fig. 5
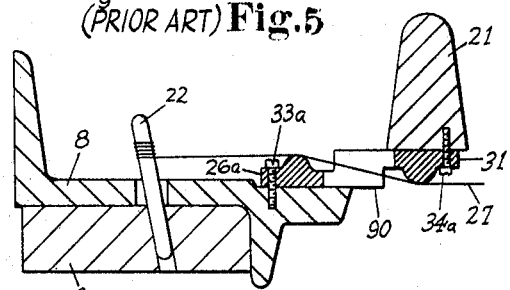
Fig. 6
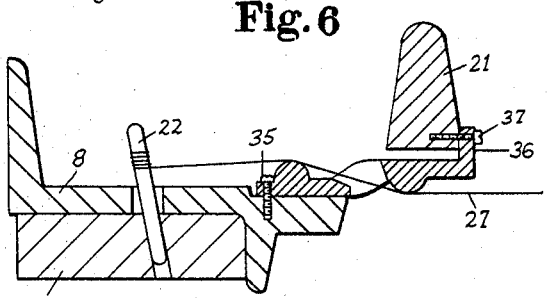
Fig. 7
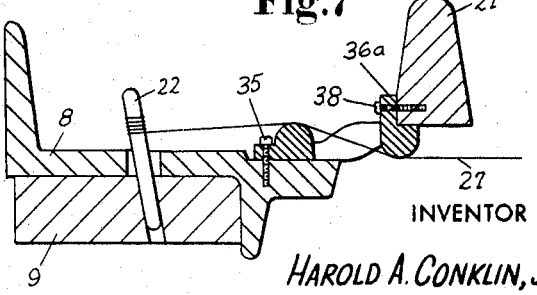
Fig. 8
INVENTOR
HAROLD A. CONKLIN, JR,
BY Yungblut, Melville, Strasser and Foster
ATTORNEYS Nov. 11, 1969     H. A. CONKLIN, JR     3,477,331
FORWARD TERMINATION MEANS FOR THE SPEAKING LENGTH
OF PIANO STRINGS AND THE LIKE
Filed Aug. 15, 1966     4 Sheets-Sheet 4

INVENTOR
HAROLD A. CONKLIN, JR.,

BY Yungblut, Melville, Strasser and Foster
ATTORNEYS

United States Patent Office 3,477,331
Patented Nov. 11, 1969

3,477,331
FORWARD TERMINATION MEANS FOR THE SPEAKING LENGTH OF PIANO STRINGS AND THE LIKE
Harold A. Conklin, Jr., Cincinnati, Ohio, assignor to D. H. Baldwin Company, Cincinnati, Ohio, a corporation of Ohio
Filed Aug. 15, 1966, Ser. No. 572,554
Int. Cl. G10c 3/04
U.S. Cl. 84—215                                    19 Claims

ABSTRACT OF THE DISCLOSURE

An elongated metallic string terminating element rigidly attached to the front portion of the string plate of a stringed musical instrument between an adjacent pair of longitudinal ribs, the termination element being perforated intermediate its opposite side edges for the passage of strings therethrough, the strings contacting oppositely directed string deflecting means extending lengthwise of the termination element on opposite sides of the perforations therein.

---

The invention relates to stringed musical instruments and has to do more particularly with improved termination means for the strings of such instruments. The invention will be described in connection with grand pianos, although it will be understood at the outset that this does not constitute a necessary limiation on the invention.

As is known in the construction of grand pianos, a string plate is provided, usually although not necessarily made of cast iron. The plate usually has a rim portion extending about at least a part of its periphery. It also has a relatively wide portion at the front of the piano, having a width at least equivalent to the width of the keyboard. The plate extends lengthwise rearwardly from the front portion a distance which is normally at least equal to the width of the front portion of the plate, and has the familiar shape of a grand piano. Several forms of string plates are in current use, and the present invention is not restricted to string plates of any specific shape. Underneath the front portion of the plate a space is usually provided for a pin block which is made of solid wood, laminated wood or other suitable material. The pin block is drilled for the acceptance of threaded tuning pins. The tuning pins pass through openings in the plate and are driven into the pin block and engaged in the drilled holes so tightly that while the pins may be turned by a tuning tool to vary the tension on the strings, they will be held firmly in place by friction so as to maintain the string tension.

The portion of the string plate toward the rear and adjacent the curved edge is provided with a flat and generally planar portion having a shape to accommodate the varying lengths of the piano strings. This portion has hitch pins which determine the positions of the rear ends of the strings which extend between the tuning pins and the hitch pins. Certain rib members forming an integral part of the plate extend from the front portion thereof to the last mentioned rear portion. Certain transverse ribs extend between the front-to-rear ribs near the front portion of the piano.

The piano will have a soundboard mounted beneath the string plate, and bearing a bridge element which may be continuous or made up of sections. The engagement of the strings with the bridge element determines the position of the rear end of the speaking length of the strings. The forward terminus of the speaking length of the strings has hitherto been determined in various ways. Some grand pianos are provided with agraffe members on the front portion of the plate. These are made of brass, having enlarged heads and threaded shanks which are turned into tapped holes in the front portion of the plate. These agraffe members have holes near their tops. The strings pass through these holes, and are deflected to the tuning pins. In other grand pianos V-shaped elements are formed on the under side of the transverse ribs mentioned above, in such a position as to deflect the strings as they pass to the tuning pins. Thus either the agraffe members or the V-bars on the under side of the transverse ribs, or both, may be used to terminate the speaking length of the strings at the front of the piano, the choice usually being dependent upon the physical space limitations imposed by the design of the plate and the clearance of the hammers. The speaking length of the strings is defined as that portion of them which extends from the forward effective string terminus to the bridge of the instrument. An action is, of course, supported on the front portion of the piano case, and has hammers which strike the strings in their speaking length to set them into vibration.

The agraffe type of forward termination is expensive and time consuming to install and adjust. The V-bar type of termination is usually cast as part of a transverse rib, and hence is made from the same material as the plate itself. This material normally is cast gray iron and it is relatively soft. Attempts have been made in the past to case harden the plate or its transverse ribs, or the V-shaped configuration beneath the transverse ribs. The V-shaped configuration conventionally comes to a rather sharp point having a radius at the apex of about $\frac{1}{32}''$ to about $\frac{3}{32}''$. This small radius is not very well able to withstand the static and dynamic forces exerted upon it by the strings, so that the V-shaped configuration is subject to wear resulting in a change of shape. The change in shape has been found to cause a deterioration in the tone of the instrument.

The shape, material and mechanical properties of the string terminations used on a piano have an important effect on the tone. Some of the factors influenced by the nature of the termination elements are tone quality (subjective), apparent duration of the tone, loudness and the like. Another important factor is the life of the termination means. If the piano is to keep its good tone, the string terminations must have a long life. The properties of the string terminations also affect the tunability of the instrument. In order for a piano to be easily and precisely tunable, the strings must move smoothly across the termination surfaces without a jerky or "stick-slip" motion when the tuning pins are turned. In terminations of conventional design, particularly those in instruments which have had extensive use, "stick-slip" motion of the strings during tuning is often encountered, thereby making it difficult to tune the instrument properly and achieve good tuning stability.

The basic objects of this invention are the provision of a type of forward string termination in grand or other pianos adjacent the tuning pins which gives improved quality and duration of tone and is free of the disadvantages set forth above.

Another object of the invention is the provision of improved means for terminating the speaking length of the strings adjacent the tuning pins which is essentially free from deterioration of tone quality due to wear, the critical termination surfaces being formed in a way which preserves the shape and accuracy required to produce and maintain good tone.

Yet another object of the invention is the provision of improved termination means for the speaking length of the strings adjacent the tuning pins which eliminates or greatly reduces "stick-slip" or jerky motion of the strings during tuning, thereby making it easier to adjust the tension of the strings for correct pitch.

These and other objects of the invention which will be set forth hereinafter or will be apparent to one skilled in the art upon reading these specifications, are achieved by that construction and arrangement of parts of which exemplary embodiments will now be described. Reference is made to the accompanying drawings wherein:

FIGURE 1 is a partial plan view of the case and string plate of a grand piano.

FIGURE 2 is a perspective view of a portion of the string plate and appurtenances of a grand piano.

FIGURE 3 is a plan view of one type of forward string termination means of the present invention.

FIGURE 4 is an end view thereof.

FIGURE 5 is a sectional view showing a typical string termination on a triangular protuberance of a tarnsverse rib as hitherto practiced in the art.

FIGURE 6 is a sectional view taken along the line 4—4 of FIGURE 2 and showing also the relationship of the termination piece to adjacent portions of the string plate.

Figure 9:
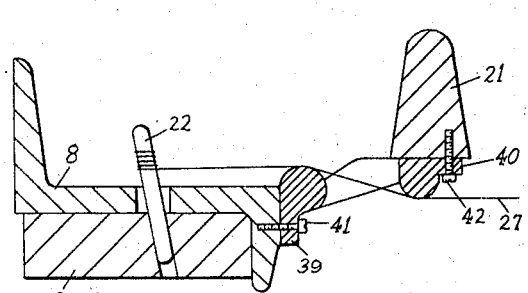

FIGURES 7 through 22 inclusive are respectively views illustrating modified termination means and the relationship of such means to elements of the string plate construction of exemplary grand pianos.

The word "termination" as used herein means the forward termination of the speaking length of the strings as will be understood by the skilled worker in the art, i.e. the termination nearest the hammers. The rear termination of the speaking length of the strings is, of course, the bridge.

In order to set forth the differences between the present invention and that which is conventional in the art, reference is first made to FIGURE 1. The piano case has an outer rim 1 of substantial depth and an inner rim 2 of lesser depth. A sounding board 3 is mounted to the inner rim and to a transverse member 4 of the piano case. A string plate 5 is mounted on the inner rim within the piano case. String plates may take various forms; but a typical one is shown in FIGURE 1. It has peripheral portions 6 by means of which it may be mounted to the inner rim 2 around the side and rear portions of the string plate. The string plate comprises generally a rear portion 7 and a front portion 8.

A tuning pin block 9, as seen in FIGURE 5 is usually located underneath the front portion 8 of the plate. Between the front and rear portions of the plate, there are various ribs indicated at 10, 11, 12, 13 and 14 which not only demark the various sections of the piano from each other but also maintain the front and rear portions of the string plate in association, and so strengthen them that the plate as a whole resists the cumulative tension of the strings. The front portion 15 of the piano case includes a keybed which supports the piano keyboard and the piano action, as is familiar to those skilled in the piano art. For simplicity the keybed and keyboard are not illustrated in the drawings; and no part of the action is shown excepting for the damper elements 16.

In the ordinary construction, the strings pass around hitch pins 17 at the rear portion of the string frame. These hitch pins are metal members engaged with a press fit in holes formed in the rear portion 7 of the string plate. The pins are inclined rearwardly so that the rear termination of the strings is down against the rear portion 7 of the string plate. Bridges 18 and 18a are attached to the soundboard 3 and the strings pass there-over so that when the strings are set into vibratory motion by the piano action this vibratory motion will be imparted to the soundboard. String rests 19 are usually placed upon or fastened to the rear portion 7 of the string plate, intermediate the bridges and the hitch pins.

The strings extend beyond the bridge 18 in the forward direction to termination means. In most grand pianos the strings are caused to contact the edges of the aforesaid relatively sharp V-shaped configurations on the bottom edges of certain transverse ribs 21 which form a part of the string plate. This is illustrated in FIGURE 5 hereof. A tuning pin 22 is shown extending into the pin block 9 through a hole in the front portion 8 of the plate. At a point spaced from the front portion of the plate the transverse rib 21, which is free from attachment to the front portion 8 excepting at its opposite ends, has on its under surface the previously mentioned V-shaped configuration 21a. A string 27 is shown passing beneath the V-shaped configuration 21a and thence to the tuning pin 22 over an intermediate agraffe means 20a. This agraffe means is shown in FIGURE 5 as a V-shaped configuration projecting upwardly from the front portion 8 of the string plate. It will be understood that one basic method for terminating the speaking length of a string is to pass the string over or under members such as 20a or 21a shown in FIGURE 5, which members effect a change in the direction of the string by deflecting it.

In the arrangement shown in FIGURE 5 considerable damping is encountered. The losses due to internal damping through the action of the piano string plate itself are relatively large because the gray iron of which the plate is cast has an internal damping effect of the order of ten to fifty times the damping effect of steel. Moreover it will be noted that the transverse rib 21 is free in space excepting at its ends where it joins two adjacent ones of the string frame ribs 10 to 14 inclusive. The front portion 8 of the string frame also exerts upon the string 27 a substantial damping action through the agraffe means 20a.

In accordance with the instant invention it has been found that damping due to the string plate (or any other source is detrimental to the tone of the instrument and that less damping of the string by the termination means will result in better tone. Accordingly it was found that the damping action of the forward termination means, if of the type illustrated in FIGURE 5, can be materially reduced if the string termination rib 21 is rigidly joined to the front portion 8 of the string plate. Where this is done, the increased stiffness imparted to the rib results in a significant reduction in damping together with an improvement in quality and duration of tone. Preferably a means is provided for joining the rib 21 to the front portion 8 of the string plate which is made of steel rather than gray iron. This results in a further increase in stiffness and also a further significant reduction in damping. In either or both of these ways an improvement in the quality and duration of tone is achieved.

The present invention is additionally based upon the discovery that the use of a termination element 90 having a curved or rounded string contacting surface of relatively large radius (3/16" or more) gives improved results. The reasons why this is so are not fully understood. It has been found, however, that steel termination elements having string contacting surfaces of relatively large radius, when made as hereinafter set forth, produce a superior initial tone quality.

At the same time, if the steel strings contact a steel termination piece directly, wear is relatively rapid so that after the strings have been tuned a few times, a "stick-slip" effect may result, making it difficult to tune the instrument. With the steel of the strings operating against the gray iron of the V-shaped configuration 21a of FIGURE 5, or against termination configurations on a steel element connecting the transverse rib 21 with the forward portion 8 of the string plate, a frictional condition is set up which seems to promote wear. This is not to say that a bare steel termination element cannot effectively be used. Wear of the termination surface can be substantially minimized by surface hardening or case hardening of the steel element. Hardening of the surface of the steel termination elements will, however, lead to more rapid wear of the steel piano string wire and will not necessarily eliminate "stick-slip."

Improved performance has been obtained by the use of steel termination elements as hereinafter described, which elements have been plated with brass. The brass coating appears to impart a lubric or friction reducing characteristic to the termination elements which prevents binding when the steel strings are moved relative to the elements. By the same token, it is within the scope of the invention to utilize a coating or coatings of other metals, or of other materials, such as plastics, which have similar lubricating characteristics with respect to the steel strings. Generally speaking, the coating material should be softer than the steel strings, and the underlying surface of the termination element should be harder than the strings. The best termination elements thus far tested were composed of liquid carburized steel which had been plated with brass. It also should be pointed out that the termination elements may be made from materials other than steel, but the quantity of tone improvement obtainable will depend basically on the stiffness (elastic modulus) of the material and upon its internal losses. As has previously been pointed out, damping has been found to be undesirable if maximum duration and quality of tone are to be achieved. Brass, for example, has somewhat less than half the elastic modulus of steel and roughly double the internal losses, which makes it a much less satisfactory termination element than steel. In adidtion its wear characteristics are less satisfactory.

It should be borne in mind, however, that the ability of the termination elements of this invention to improve the tone of the piano arises in part from the shape of the pieces on the termination elements which directly contact the strings. While not desiring to be bound by theory, it is believed that a large radius termination acts to reflect more of the energy of the speaking length of the string so as to minimize the loss of that energy in the non-speaking part of the string. Improvement in tone quality is detectable throughout the range of the instrument, but is more evident at high frequencies than at low frequencies. It is within the scope of the invention to use the termination elements hereof either throughout the enitre tonal range of the instrument or in the upper portions only of the tonal range thereof.

A factor involved in the present invention is the reduction of energy loss in the termination element itself by increasing its stiffness. It may be pointed out that the conventional V-bar (which is stiffened by the transverse rib in a vertical plane) lacks stiffness in the horizontal plane, i.e. in the general plane of the strings.

The nature of exemplary termination elements 90 of this invention will be understood from FIGURES 2, 3, and 4. The termination elements are configured to provide a flange 26, an adjacent portion having a part 28 of relatively large radius, a body 29, a second portion 30 of large radius, and a flange 31. It will be noted from FIGURES 3 and 4 that the flange elements 26 and 31 are not at the same level.

The central portion of the termination element is pierced with elongated holes 32 for the passage of the strings of the piano. These holes are made wide enough to accommodate the strings of any given note in such a way that the strings contact only the large radius portions 28 and 30. The skilled worker in the art will understand that the strings for the intermediate and treble sections of the piano normally consist of two or three wire elements tuned to the same frequency. One such string is shown at 27 in FIGURE 4. The index numeral 27a indicates a portion of the speaking length of the string, while the index numeral 27b indicates that part of the string which passes to the tuning pin.

The flange portion 31 is designed to be attached to the lower side of the transverse rib 21, and the flange 26 is designed to be attached to an edge portion of the front part 8 of the string plate, as shown in FIGURE 6. The attachment may be accomplished in various ways. In some instances the use of an epoxy resin will serve the purpose. However, the flange portions of the termination element may be drilled with holes 33 and 34 at intervals so that the attachment may be accomplished by machine screws 33a and 34a. As illustrated in FIGURE 3, the adjacent portions of the large radius configurations 28 and 30 may be routed out to accommodate the heads of the machine screws or bolts employed. This can be done without in any way affecting the bearing of the strings on the large radius configurations.

It will be seen that the string termination element illustrated in FIGURES 3, 4 and 6 is very stiff and rigid, and also that it effects a rigid connection between the transverse string termination rib 21 and the adjacent front planar portion 8 of the string plate. The termination elements may be of any desired length but are preferably so made as to take care of all of the strings lying between adjacent longitudinal ribs, such as the ribs 10 to 14, inclusive, of the string plate. Further, it will be noted that the termination elements of this invention can be readily replaced if wear should occur.

FIGURE 7 in which like parts are given like index numerals shows a comparable termination element held to the front portion of the string plate by bolts 35. It has an upwardly extending rear flange 36 which is held to the transverse rib 21 by bolts 37.

A slightly modified version is shown in FIGURE 8 wherein a flange 36a is fastened to the forward face of the rib 21 by bolts 38.

In FIGURE 9, flanges 39 and 40 are provided on the termination element. These flanges are held, respectively, to the front portion 8 of the string plate and the rib 21 by bolts 41 and 42.

Figure 10:
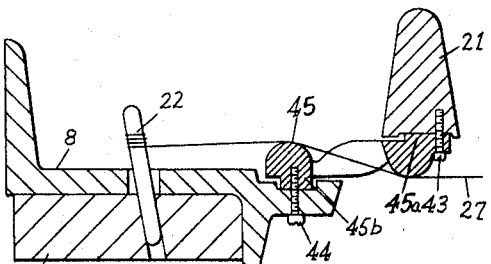

Yet another mode of fastening the termination element to the transverse rib 21 and the forward portion 8 of the string plate is illustrated in FIGURE 10. In this embodiment sets of bolts 43 and 44 secure the termination member 45 to the rib 21 and the extending flange 46 on the front portion of the string plate, respectively, the sets of bolts being threaded into bosses 45a and 45b. It will be understood that the bosses 45a and 45b are representative of a series of bosses lying at spaced intervals throughout the length of the termination element.

Figure 11:
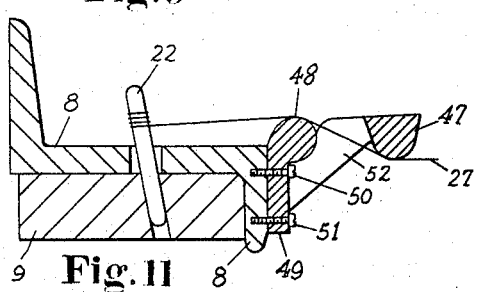

In the event the string plate is not provided with the transverse rib 21 or its equivalent, or in the event the transverse rib is so located as to make it difficult or impossible to attach the termination element to it, a structure may be employed such as that shown in FIGURE 11. Here the termination element is so constructed as to provide a rear bar-like part 47 having a rounded lower edge, and a front bar-like part 48 having a rounded upper edge. An elongated flange 49 is provided on the last mentioned part; and flange 49 may be bolted to a downwardly depending flange 8a on the front portion of the string plate by means of a series of bolts indicated at 50 and 51. The web-like portions 52 of the termination piece are in this instance enlarged toward the front portion of the string plate so as to contribute additional transverse rigidity to the termination element. It will be understood that the web-like portions 52 are those portions which are left by the formation of passageways for the strings 27, and that the termination element consisting of the parts 47, 48, 49 and 52 constitutes a unitary metallic structure.

Figure 12:
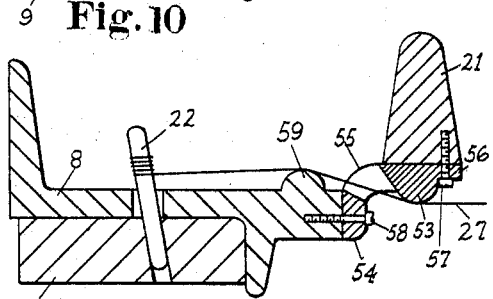

In FIGURE 12, a termination element is shown which as originally formed has a rear portion 53 and a tail 54. The piece is perforated for the passage of the strings 27, leaving web portions 55 in the tail. There is a rear flange 56 which can be bolted to the transverse rib 21 by a series of bolts 57. The tail is bent downwardly as illustrated so that it may be bolted to the front portion 8 of the string plate by a series of bolts 58. In this instance the counterbearing ridge 59 is cast upon the string plate. Preferably it will be provided with a large radius (of the order of about 3/16").

Figure 13:
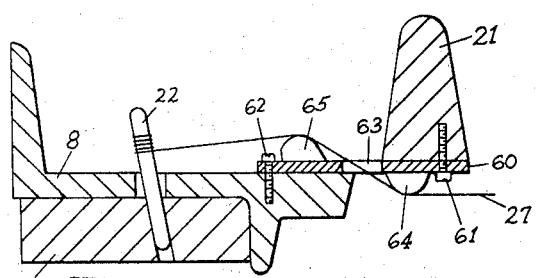

In FIGURE 13, the transverse rib 21 of the string plate is connected to the front portion 8 by a plate element 60. The rear portion of this plate is connected to the rib 21 by a series of bolts 61, while the front portion of it is connected to the front portion of the string plate by a series of bolts 62. The plate is perforated at intervals in its midsection as indicated at 63. The purpose of this structural modification is to simplify and reduce the cost of the termination element and to avoid a considerable part of the milling operations which might otherwise be necessary. The plate 60 can be made as thick as is desirable for rigidity; but the perforations 63 can be made usually by boring operations. A rear bearing member 64 and a front bearing member 65 are separately made and attached to the plate 60, in the positions shown, by brazing or welding. The elements 64, 65 may be made in the form of bar-like elements having rounded edges of relatively large radius as defined herein.

Figure 14:
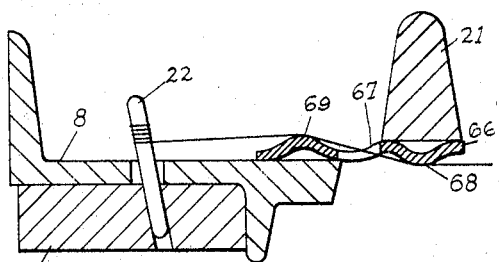

An offshoot of the structure of FIGURE 13 is illustrated in FIGURE 14. Here use is again made of a plate-like element 66 which may be perforated as at 67, and which is attached respectively to the under side of the transverse rib 21 and to the upper side of the front portion of the string plate 5 by bolts, welding, brazing or epoxy resin. Instead, however, of providing the bar-like bearing elements 64 and 65 shown in FIGURE 13, the plate 66 of FIGURE 14 is embossed or corrugated, as at 68 and 69, to accomplish the same purpose. The structure of FIGURE 14 is a compromise structure. The plate 66 should be made as thick as possible to provide rigidity while permitting the element to be bent or corrugated, as shown, and the perforations 67 to be made by boring or punching.

Figure 15:
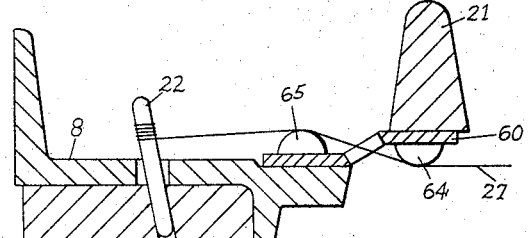

The structure of FIGURE 13 may be modified as shown in FIGURE 15 wherein like parts are given like index numerals. The essential difference here is that the plate 60 is bent intermediate its side edges to extend between an upper surface on the front portion 8 of the string plate which is substantially lower than the under surface of the transverse rib 21.

Figure 16:
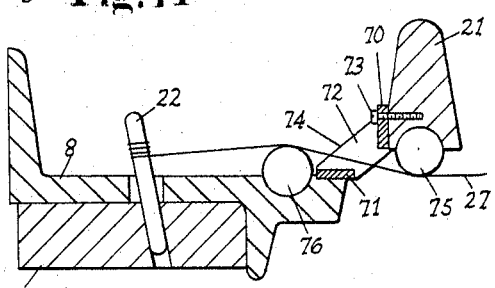

In FIGURE 16 a modified form of element is used to interconnect the transverse rib 21 and the front portion 8 of the string plate. This element has a rear vertical portion 70 and a front horizontal portion 71 connected by webs 72. The rear vertical portion is attached to the transverse rib by a series of bolts 73, while the front horizontal portion is attached to the front portion of the string plate by a series of bolts 74. The element consisting of the described portions 70, 71, and 72 can be made by machining from steel, or it can be made as a casting, but in the latter event the casting is preferably made from a steel formula rather than a gray iron formula. The actual bearing members for the strings 27 may comprise cylindrical rod-like elements 75 and 76. These rod-like elements may be engaged in recesses respectively in the under side of the transverse rib 21 and in the upper side of the front portion 8 of the string plate. Preferably the rod-like elements 75 and 76 are made of case hardened steel which has been brass plated.

It is possible in the practice of this invention to fabricate structures which can be used in lieu of a unitary configured metal plate for use as the forward termination for the speaking length of pianos or other instruments. The purpose of such fabrication is in general that of providing termination pieces of lower cost by reason of the elimination or minimizing of machining operations on a unitary bar. For example, in FIGURES 17 and 18, a termination element is fabricated from link members 77 and intermediate substantially cylindrical members 78. The cylindrical members, hereinafter termed "beads" for brevity, may be produced by cutting apart into small lengths cylindrical rod-like elements, such as elements 75 and 76 described in connection with FIGURE 16. The axial length of the beads 78 should be sufficient to permit the passage of strings 27 between the link members 77 without contact therewith, keeping in mind the fact that in the treble sections of the piano there are usually three strings per note, the strings for any given note being located in relatively close proximity to each other. The spacing between strings or groups of strings may be anything permitted by the construction and disposition of the parts of the string plate. As a consequence, for the sake of rigidity, the thickness of the link members 77 may be made as great as the spatial limitations permit. The beads may be fastened to the link members in various ways, as by welding, brazing or the like. One mode of assembly is to provide the bead members with small central perforations 79 and the link members with properly spaced perforations 80. The link and bead members may then be strung on a series of wires; and the entire structure may be subjected to a hydrogen brazing operation as known in the art.

Figure 17:
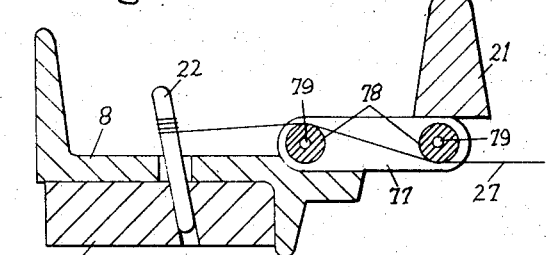
Figure 18:
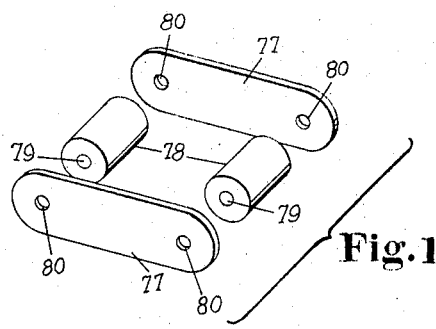

The structure illustrated in FIGURES 17 and 18 will normally be made up of a plurality of the illustrated link sections integrally joined together and of a combined length sufficient to accommodate all of the strings in a particular section of the string plate corresponding in length to the length of a transverse rib 21 of the string plate between longitudinal ribs thereof. It will be preferable to fasten the link structures of FIGURES 17 and 18 rigidly to the front portion 8 of the string plate and to the adjacent transverse rib 21 in the position shown in FIGURE 17. This may be done in a variety of ways, as by welding, brazing, cementing or bolting, the actual attachment being between the link members 77 and the adjacent parts of the string plate.

Figure 19:
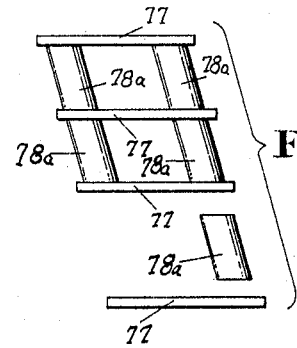
Figure 20:
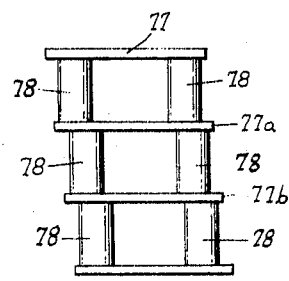

The fabrication of a termination element for the speaking length of the strings in a grand piano in the manner just described is not only simpler and cheaper than the manufacture of a termination element from a single strip or bar of steel by relatively complex machining operations, but it also can be so accomplished that compensations in shape can be made for directions of extent of piano strings which are not necessarily normal to the central axis of the tremination element. Thus, as shown in FIGURE 19, the link members 77 can be made to lie at other than a right angle to the axes of the bead portions 78a by cutting the beads from rod-like elements in such a way that the beads will have end surfaces at an angle to their longitudinal axes. As shown in FIGURE 20, the same result may be accomplished using beads 78 having square cut ends with link members 77, 77a, 77b, etc. in a configuration in which the beads do not lie in precise axial alignment with each other.

Figure 21:
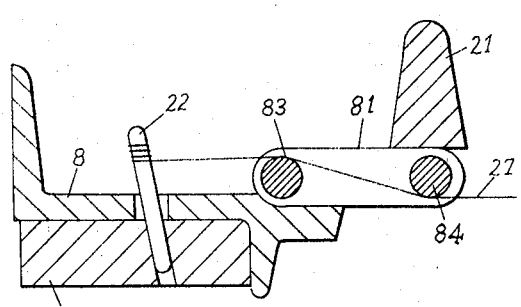
Figure 22:
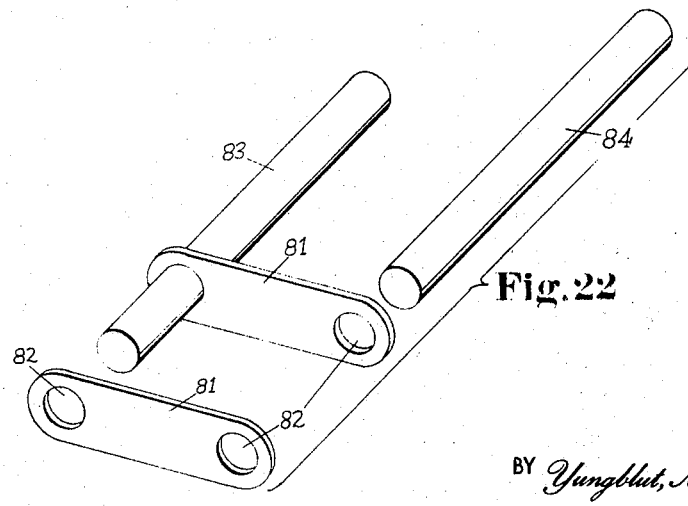

A modified structure is shown in FIGURES 21 and 22 wherein the link members 81 are provided with spaced holes 82 adjacent their ends. Continuous rod-like members 83 and 84 are passed through these holes and the link members are given a desired interspacing along the length of the rod-like members. The rod-like members may be permanently fastened to the links by brazing or welding. The completed structure may be fastened to the under side of the transverse rib 21 and to the upper side of the forward portion 8 of the string plate, as shown in FIGURE 21. It will be noted that the string 27 passes beneath the rod-like element 84 and above the rod-like element 83 to accomplish the purposes of the invention.

In one basic form, the termination elements of this invention comprise a slotted piece of metal (or a fabricated structure) having a radiused or curved ridge at each edge but on opposite sides. The thickness and width of the metal piece are controlled by the desired string deflection angle, by the desired stiffness of the termination element and by the mounting requirements. When observed in plan, the length of the termination element is dictated by the number and spacing of the strings to be served by it. The center lines of the radiused portions may be rectilinear or curvilinear, as suits the scale of the instrument.

The termination elements should be attached to the string plate and should preferably be stiff and rigid. Preferably also, the termination element are made of a material having low damping characteristics. If the string plate of the instrument is characterized by transverse ribs 21, and especially if these transverse ribs are used in any way to support elements for deflecting the strings, it is preferable to have the termination elements effect a rigid connection between the transverse ribs and the front portion of the string plate.

A number of the advantages of the invention may be achieved by making the termination element of a metal such as brass or bronze even though such metals have a greater damping characteristic than steel. But best results appear to be attained by using a steel such as AISI8620. The mention of this specific steel is intended to be illustrative only since other steels can be used. Preferably, the steel termination pieces should be case hardened or surface hardened, preferably the latter. Hardening the steel termination elements throughout their thickness is less advantageous because the metal is more likely to become brittle and is more subject to breakage if any slight flexing occurs during installation or use. As previously indicated, the life of steel terminaiton elements is improved (as to wear resistance) by coating them with brass or some other material having a lubricating quality when operating against the steel of the strings.

While the invention has been described in connection with grand pianos, it will be understood that it is applicable to other types of pianos and to other types of stringed instruments. The term "front portion" of the string plate is aptly descriptive of that end of a grand piano string plate with which the pin block is associated. In other types of pianos where the string plate may be set vertically, the term "front portion" will be understood to refer to the pin block end of the plate, and the term "rear portion" to refer to the opposite end.

Modifications may be made in the invention without departing from its spirit and purpose. For example, in order to facilitate the proper alignment of the strings relative to the termination elements, the string deflecting part 28, as seen in FIGURE 3, may be provided throughout its length with spaced apart sets of grooves or slots 85 aligned with the openings 32. The number of grooves in each set 85 will depend upon the number of strings passing through through the openings, and it will be understood that the grooves will be so spaced relative to each other that the strings will be properly aligned and positioned relative to each other and to the termination element. Obviously, such sets of grooves may be employed with any of the various embodiments of the termination elements to facilitate proper positioning of the strings.

While a preference has been expressed for string deflecting members having a relatively large radius, it will be understood that the shape of the string deflecting members may be varied. Thus, while in numerous of the illustrated embodiments the string deflecting members are shown as being circular or semi-circular in cross-section, the primary consideration is that the surfaces which are actually contacted by the strings be of relatively large radius. Thus, the members 28 and 30, or their equivalents in the various embodiments, may comprise a minor segment of a circle or other curved surface which effects smooth line contact with the strings rather than essentially point contact, as in the case of the convention V-bar construction. It is to be understood, however, that irrespective of the configuration of the string contacing surfaces, the damping action of the forward termination means will be materially reduced by interconnecting the rib 21 and the front portion 8 of the string plate in the manner herein disclosed.

It will also be uunderstood that the various modifications of the termination elements herein disclosed are not exhaustive of all possible modifications. For example, in some instances the under surface of the transverse rib 21 and/or the upper surface of the front portion 8 of the string plate are provided with spaced apart lugs or pads to which separate V-bar members are secured. It will be evident that the termination elements of the instant invention may be affixed to such pads in various ways.

The embodiments of the invention in which an exclusive property or privilege is claimed are defined as follows:

1. In a stringed instrument having a string plate characterized by a front portion, a rear portion, a plurality of spaced apart longitudinal ribs joining the front and rear portions of the plate, together with strings extending from hitch pins on the rear portion of the plate to tuning pins on the front portion thereof, the improvement which consists in a separate string termination means adapted to be rigidly secured to said string plate, said termination means comprising a generally rectangular metallic member which is formed and finished prior to its attachment to said string plate, said member having deflecting elements extending along its opposite side edges and facing in opposite directions, said member being perforated intermediate said string deflecting elements for the free passage of strings therethrough, there being a separate perforation for the strings of each note, whereby said deflecting elements are connected together and rigidified at closely spaced apart intervals, said member including means for rigidly connecting one side edge thereof to the front portion of said string plate.

2. The structure claim in claim 1 wherein said string deflecting elements have string contacting portions which have an arcuate surface with a radius of at least about $3/16$ inch.

3. The structure claimed in claim 1 wherein said member is attached along one side edge to the underside of a transverse rib lying adjacent the front portion of the string plate and along the other side edge to the upperside of the said front portion of the string plate.

4. The structure claimed in claim 1 wherein said member is made of hardened steel and wherein a coating of lubricating substance covers at least the string deflecting elements.

5. The structure claimed in claim 1 wherein one of said string deflecting elements has spaced apart grooves therein for aligning the strings, said grooves extending transverse the length of said string deflecting element and in alignment with the perforations in said metallic member.

6. The structure claimed in claim 1 wherein said metallic member is in the form of a fabricated structure consisting of spaced apart link members extending in a forward-to-rear direction and having rod receiving openings adjacent their opposite ends, and rod-like members extending in spaced relationship through the openings in said links and fastened thereto, said rod-like members defining said string deflecting elements, and said spaced apart links and said rod-like members defining therebetween the perforations in said member for the passage of the strings therethrough.

7. The structure claimed in claim 1 wherein said metallic member is a fabricated structure comprising interspaced link members and cylindrical elements extending in spaced relationship between adjacent ones of said link members and fastened thereto, said cylindrical elements defining said string deflecting elements, and said interspaced link members and said cylindrical elements defining therebetween the perforations in said member for the passage of the strings therethrough.

8. The structure claimed in claim 7 wherein adjoining cylindrical elements are offset laterally with respect to each other.

9. In a stringed instrument having a string plate, the improvement which consists in a separate string termination means adapted to be rigidly secured to said string plate, said termination means comprising a generally rectangular metallic member which is formed and finished prior to its attachment to said string plate, said member having deflecting elements extending along its opposite side edges and facing in opposite directions, said member being perforated intermediate said string deflecting elements for the free passage of strings therethrough, at least one side edge of said member including means for rigidly connecting it to said string plate.

10. The string termination means claimed in claim 9 wherein said string deflecting elements have an arcuate surface with a radius of at least about 3/16 inch, and wherein one of said string deflecting elements has transversely disposed spaced apart grooves in the arcuate surface thereof in which the strings are received.

11. A string termination element comprising an elongated metallic member having string deflecting portions extending lengthwise along its opposite side edges and facing in opposite directions, said member being perforated intermediate said string deflecting portions for the free passage of strings therethrough, the opposite side edges of said member including means for connecting said termination element to the string plate of a stringed musical instrument.

12. The termination element claimed in claim 11 wherein said string deflecting portions have arcuate string contacting surfaces of a radius of at least 3/16".

13. The termination element claimed in claim 12 wherein said string deflecting portions at least are formed from surface hardened steel.

14. The termination element claimed in claim 13 wherein said string deflecting portions at least is coated with a lubric substance.

15. The termination element claimed in claim 14 wherein said lubric substance is brass.

16. In a piano having a string plate characterized by a front portion, a rear portion, a plurality of spaced apart longitudinal ribs joining the front and rear portions of the plate and a transverse rib extending between the longitudinal ribs adjacent the front portion of the string plate, together with strings extending between and attached to said front and rear portions, the improvement which comprises a forward string termination element extending between and interconnecting the front portion of said string plate and said transverse rib, said termination element comprising an elongated steel member having a first string deflecting means extending lengthwise thereof and positioned to underlie said transverse rib, and a second string deflecting means also extending lengthwises of said elongated member and positioned to overlie the forward portion of said string plate, the central portion of said steel member being perforated to provide opening for the passage of the strings therethrough, whereby the strings extending between the front and rear portions of the string plate, pass through said perforations and are successively contacted and deflected by said deflecting means.

17. The structure claimed in claim 16 wherein said deflection means each has a string contacting surface of arcuate configuration having a radius of at least 3/16", and wherein said string contacting surfaces are formed of hardened steel.

18. The structure claimed in claim 17 wherein said string contacting surfaces are coated with brass.

19. The structure claimed in claim 18 wherein the said string contacting surfaces have spaced apart grooves therein in alignment with the perforations in the center portion of said steel member for aligning said strings relative to said termination element.

References Cited
UNITED STATES PATENTS

| | | | |
|---|---|---|---|
| 509,111 | 11/1893 | Ziegler | 84—215 |
| 634,282 | 10/1899 | Ziegler | 84—185 |
| 794,356 | 7/1905 | Hornbeck | 84—215 |
| 386,080 | 7/1888 | McDonald | 84—215 |

RICHARD B. WILKINSON, Primary Examiner

L. R. FRANKLIN, Assistant Examiner